US009769305B2

(12) United States Patent
Banerjee et al.

(10) Patent No.: US 9,769,305 B2
(45) Date of Patent: Sep. 19, 2017

(54) SYSTEM AND METHOD FOR POWER EFFECTIVE PARTICIPATORY SENSING

(71) Applicant: Tata Consultancy Services Limited, Nariman Point, Mumbai (IN)

(72) Inventors: Rohan Banerjee, West Bengal (IN); Aniruddha Sinha, West Bengal (IN); Arindam Saha, West Bengal (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 16 days.

(21) Appl. No.: 14/772,928

(22) PCT Filed: Mar. 13, 2014

(86) PCT No.: PCT/IN2014/000162
§ 371 (c)(1),
(2) Date: Sep. 4, 2015

(87) PCT Pub. No.: WO2014/162316
PCT Pub. Date: Oct. 9, 2014

(65) Prior Publication Data
US 2016/0021237 A1      Jan. 21, 2016

(30) Foreign Application Priority Data
Apr. 1, 2013   (IN) .................. 1269/MUM/2013

(51) Int. Cl.
*H04W 4/00* (2009.01)
*H04M 1/725* (2006.01)
(Continued)

(52) U.S. Cl.
CPC ....... *H04M 1/72569* (2013.01); *H04W 4/001* (2013.01); *H04W 4/006* (2013.01);
(Continued)

(58) Field of Classification Search
None
See application file for complete search history.

(56) References Cited

U.S. PATENT DOCUMENTS 6,718,239 B2    4/2004  Rayner
7,386,376 B2    6/2008  Basir et al.
(Continued)

FOREIGN PATENT DOCUMENTS

EP    2264988 A1    12/2010

OTHER PUBLICATIONS

Delphine Christin, Andreas Reinhardt, Salil S. Kanhere, Matthias Hollick; "A Survey on Privacy in Mobile Participatory Sensing Applications"; vol. 84, Issue 11, Nov. 2011; pp. 1928-1946.
(Continued)

*Primary Examiner* — Kodzovi Acolatse
(74) *Attorney, Agent, or Firm* — Ohlandt, Greeley, Ruggiero & Perle, LLP

(57) ABSTRACT

Disclosed is a method and system enabling power effective participatory sensing. The hand held device of the system is equipped with plurality of sensors, and is configured to enable the power effective sensor to monitor operation of the power intensive sensors. In one embodiment, a participatory sensing approach is used for traffic condition. A methodology for triggering power hungry sensors (audio) with the help of low power sensors (accelerometer) is presented which is able to reduce the overall power consumption of the mobile device. Further, a decision tree based approach is used to classify the level of congestion by measuring the horn density in a particular location.

20 Claims, 5 Drawing Sheets

(51) Int. Cl.
*H04W 4/02* (2009.01)
*H04W 4/04* (2009.01)
*H04W 52/02* (2009.01)

(52) U.S. Cl.
CPC ............ *H04W 4/02* (2013.01); *H04W 4/027* (2013.01); *H04W 4/046* (2013.01); *H04W 52/0254* (2013.01); *Y02B 60/50* (2013.01)

(56) References Cited

U.S. PATENT DOCUMENTS

| | | | |
|---|---|---|---|
| 7,680,749 B1* | 3/2010 | Golding | G01C 21/3484 706/14 |
| 8,179,268 B2 | 5/2012 | Gannot et al. | |
| 8,706,172 B2 | 4/2014 | Priyantha et al. | |
| 2007/0257782 A1 | 11/2007 | Etcheson | |
| 2008/0252485 A1 | 10/2008 | Lagassey | |
| 2009/0089446 A1* | 4/2009 | Ebling | G06F 15/16 709/231 |
| 2011/0298887 A1 | 12/2011 | Maglaque | |
| 2012/0188376 A1* | 7/2012 | Chatow | G07C 5/0891 348/148 |
| 2012/0224706 A1 | 9/2012 | Hwang et al. | |
| 2012/0303369 A1* | 11/2012 | Brush | G10L 17/02 704/246 |
| 2014/0129866 A1* | 5/2014 | Hallman | H04L 67/12 713/340 |
| 2014/0179298 A1* | 6/2014 | Grokop | G01S 19/48 455/418 |
| 2014/0208333 A1* | 7/2014 | Beals | G06F 9/542 719/318 |

OTHER PUBLICATIONS

Ashish Dhar; "Traffic and Road Condition Monitoring System"; Dept. of Computer Science and Engineering Indian Institute of Technology, Bombay Mumbai, M. Tec. Stage 1 Report, Roll No. 07305041, Nov. 2008; 26 pages.

Yi Wang, Jialiu Lin, Murali Annavaram, Quinn A. Jacobson, Jason Hong, Bhaskar Krishnamachari, Norman Sadeh; "A Framework of Energy Efficient Mobile Sensing for Automatic User State Recognition"; MobiSys '09; Jun. 22, 2009; 14 pages.

Hong Lu, Jun Yang, Zhigang Liu, Nicholas D. Lane, Tanzeem Choudhury, Andrew T. Campbell; "The Jigsaw Continuous Sensing Engine for Mobile Phone Applications"; SenSys '10, Nov. 3, 2010; 14 pages.

International Search Report dated Jan. 28, 2015 from PCT/IN14/00162, 2 pages.

* cited by examiner

SYSTEM AND METHOD FOR POWER EFFECTIVE PARTICIPATORY SENSING

TECHNICAL FIELD

The present subject matter described herein, in general, relates to participatory sensing, and more particularly to a power effective participatory sensing approach in hand held devices.

BACKGROUND

Participatory Sensing is an idea of the society (the groups of people) for providing sensory information. The idea of participatory sensing arises from the improvement of sensor enabled mobile phones in the last few years, which made participatory sensing feasible on a large-scale. The present mobile phone apart from their conventional communication facilities, are equipped with a variety of sensors like accelerometer, gyroscope, Global Position System (GPS) etc. Thus by collecting and aggregating data from plurality of phones sensors in a similar location, important estimations on road, traffic congestion, weather conditions, ecological information, and any other sensory information can be obtained. This approach resolves the problem of installing and monitoring roadside sensors. Moreover, decision making can be done by reading several sensors, which makes the approach more reliable.

The challenge in participatory sensing lies in the optimum and effective utilization of mobile phone sensors. In order to make effective utilization of mobile phone sensors, the fact that the applications use minimum mobile phone resources, must be taken into consideration. The unsafe collection of information poses further challenges to the authenticity of transmitted information. Individual sensors may require a trusted platform or hierarchical trust structures. Additional challenges include, but are not limited to, security, and privacy.

In traditional approach for monitoring traffic conditions, participatory sensing based solution for traffic condition monitoring uses the inbuilt sensors like microphone sensor, accelerometer sensor, GPS sensors etc., of users' mobile phones for traffic condition monitoring. The major problem in these participatory sensing approaches is that some sensors like microphone or GPS consumes huge amount of battery power. The conventional systems do not pay attention to the power consumption issue of mobile phones.

Traditionally, the general power consumptions of the mobile phone sensors have been estimated, from which it can be inferred that sensors like microphones and GPS consume huge amount of battery power of the mobile device. Accelerometer, on the other hand consumes very less power. Thus, if some logic is derived to turn on and off the high power consuming sensors using continuous monitoring of the low power consuming sensors, then the overall power consumption of the system can be significantly reduced.

SUMMARY

This summary is provided to introduce aspects related to systems and methods for power effective participatory sensing and the aspects are further described below in the detailed description. This summary is not intended to identify essential features of the claimed subject matter nor is it intended for use in determining or limiting the scope of the claimed subject matter.

In one implementation, a participatory sensing system enabling at least one power effective sensor to monitor operation of one or more power intensive sensors is disclosed. The participatory sensing system comprises a hand held device, at least one power effective sensor, one or more power intensive sensors, and a backend server. The hand held device is equipped with plurality of sensors, and configured to enable the power effective sensor to monitor operation of the power intensive sensors. The power effective sensor remains in an active state to capture and analyze contextual information related to an object area. The analyzed contextual information received from the power effective sensor triggers the one or more power intensive sensors for audio recording. At least one feature from the audio recording is extracted and concurrently a corresponding metadata file is generated. A backend server receives the features and the metadata file from the hand held device which is further mapped with the loaded training models for tracking and monitoring the object area condition.

In one implementation, an energy efficient method for participatory sensing for enabling at least one power effective sensor to monitor operation of one or more power intensive sensors is disclosed. The power effective sensor remains in an active state to capture and analyze contextual information related to an object area. In response to receiving analyzed contextual information from the power effective sensor, the one or more power intensive sensors are triggered to initiate audio recording for extracting at least one feature therefrom, and concurrently generate a corresponding metadata file; and the features and the metadata file are then transmitted for analysis, to a backend server, wherein said features and the metadata file are analyzed for tracking the object area condition.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods an energy efficient method for participatory sensing for enabling at least one power effective sensor to monitor operation of one or more power intensive sensors are described. The present subject matter discloses effective and efficient mechanism for triggered sensing based approach wherein at least one power effective sensor is always on and which turns on one or more power intensive sensors for capturing contextual information related to an object area when some triggering event occur that needs to be recorded. The participatory sensing system uses an accelerometer, orientation sensor and the like, or a combination thereof as the power effective sensors; and microphones, Global Positioning System (GPS); gyroscope, location providing sensors and the like, or a combination thereof as the power intensive sensors. The contextual information captured includes location based information, timestamp information, traffic conditions, weather conditions, area estimations and the like. The power effective sensor analyses the contextual information. For example, the contextual information can be analyzed based on vehicular static or dynamic state interpreted from an accelerometer data, vehicle-honking rate or a combination thereof.

Based on the analyzed contextual information the system triggers the one or more power intensive sensors for audio recording in the object area or area in the close proximity of the object area. Further, at least one feature from the audio recording is extracted and a corresponding metadata file is concurrently generated. For example, a decision tree based approach is used for classifying at least one feature from the audio recording by measuring the audio density in a particular area.

While aspects of described system and method for power effective participatory sensing may be implemented in any number of different computing systems, environments, and/or configurations, the embodiments are described in the context of the following exemplary system.

Figure 1:
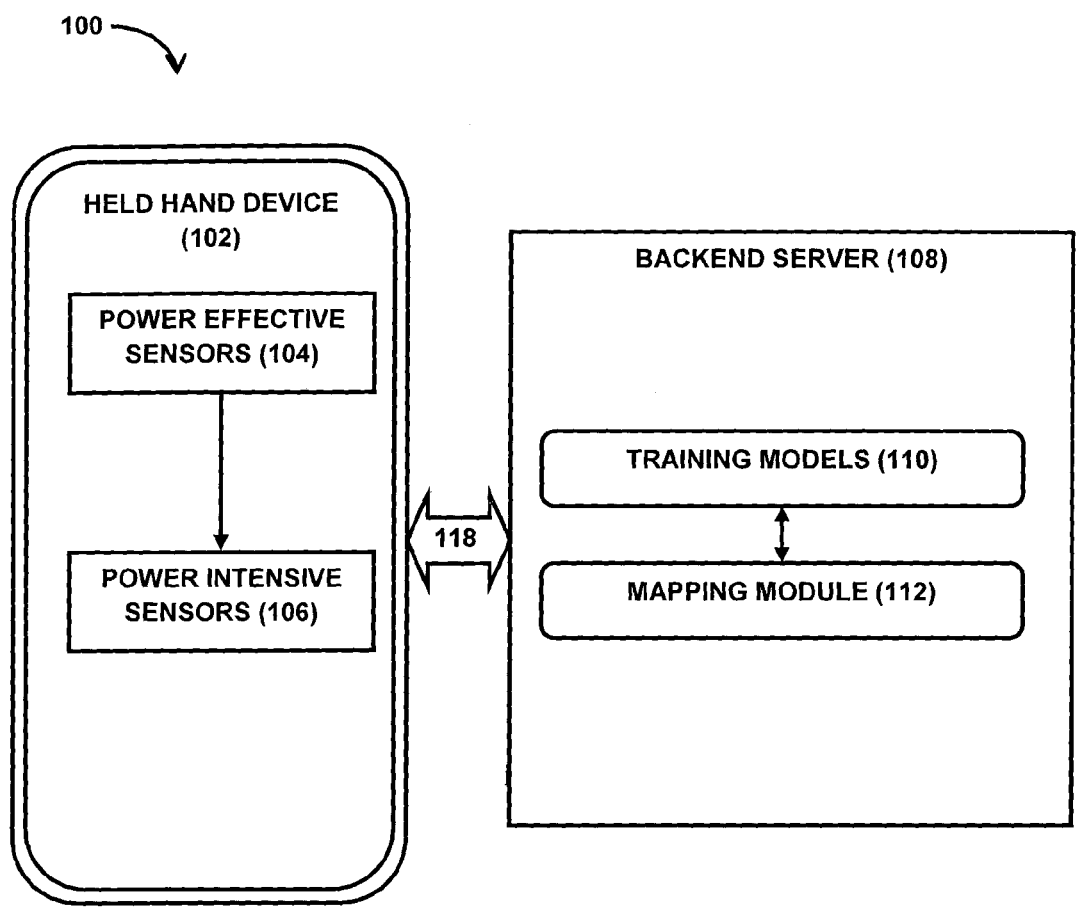
FIG. 1 illustrates a participatory sensing system, in accordance with an embodiment of the present subject matter.

Referring now to FIG. 1, the participatory sensing system for enabling efficient power utilization is disclosed. The participatory sensing system comprises a hand held device 102, at least one power effective sensor 104, one or more power intensive sensors, 106, and a backend server 108. The backed server 108 further comprises of one or more pre-loaded training models 110, and a mapping module 112. The hand held device 102 is equipped with plurality of sensors, and configured to enable the power effective sensor 104 to monitor operation of the power intensive sensors 106. The power effective sensors 104 remains in an active state to capture and analyze contextual information related to an object area. The analyzed contextual information received from the power effective sensor 104 triggers the one or more power intensive sensors 106 for audio recording. At least one feature from the audio recording is extracted and concurrently a corresponding metadata file is generated. In one alternate embodiment, the hand held device 102 compresses the features and the metadata file before transmitting to the backend server 108 to reduce the data rate. The backend server 108 receives the feature and the metadata file in compressed format from the hand held device, which is further decompressed and mapped with the loaded training models 110 for tracking and monitoring the object area condition.

Although the present subject matter is explained considering that the participatory sensing system 100 comprises of the hand held device 102, it may be understood that the hand held device 102 may also be put into practice in a variety of computing systems, such as a laptop computer, a desktop computer, a notebook, a workstation, a mainframe computer, a server, a network server, and the like. Examples of the hand held device 102 may include, but are not limited to, a portable computer, a personal digital assistant, a handheld device, and a workstation. The hand held device 102 is communicatively coupled to the backend server 108 through a network 118.

In one implementation, the network may be a wireless network, a wired network or a combination thereof. The network 118 can be implemented as one of the different types of networks, such as intranet, local area network (LAN), wide area network (WAN), the internet, and the like. The network 118 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The hand held device 102 is equipped with plurality of sensors. There can be the plurality of the power effective sensor 104 to monitor the operation of the plurality of power intensive sensors 106. In one example, the power effective sensors 104 may include an accelerometer, orientation sensor and the like, or a combination thereof. The power intensive sensors 106 may include microphones; location providing sensors such as Global Positioning System (GPS); gyroscope and the like, or a combination thereof.

The power effective sensors 104 remains in an active state to capture the contextual information related to an object area. In one example, the contextual information includes the location based information, timestamp information, traffic conditions, weather conditions, area estimations and the like. The location based information is captured using received signal strength indicator (RSSI) signals sensed from one or more hand held devices 102 present within or in close proximity of the object area. The contextual information captured is analyzed by the power effective sensors 104. In one example, the power effective sensor 104 analyses the contextual information based on vehicular static or dynamic state interpreted from an accelerometer data, and vehicle-honking rate.

In response to analyzed contextual information, the power effective sensor 104 further triggers the one or more power intensive sensors 106 for audio recording. The power effective sensor 104 may trigger the one or more power intensive sensors 106 for audio recording based on the variance of the data collected from the power effective sensor 104 and compare against a threshold limit prior to triggering of the power intensive sensors into an active state. In one example the variance of the data collected from the power effective sensor 104 is the variance of the resultant accelerometer. If the 3-axis accelerometer on mobile device captures samples in all the three axes. The resultant accelerometer is calculated using equation 1, below.

$$\hat{a}_{res} = \sqrt{\hat{x}^2 + \hat{y}^2 + \hat{z}^2} \quad (1)$$

The variance (V) of the accelerometer is computed using equation 2, below.

$$V = \frac{\sum_{k=1}^{N}(a_{resK} - \bar{a}_{res})^2}{N-1} \quad (2)$$

where, N is equal to the number of samples chosen for analysis and $\bar{a}_{res}$ is the mean acceleration value.

In one example the lower threshold value is considered as 0.5 and the upper threshold value is considered as 1.2.

The audio recording may include spoken voice, singing, instrumental music, or sound effects. The power intensive sensor 106 further extracts at least one feature from the audio recording audio recording. In one example, the power intensive sensors 106 accomplishes feature extraction by using a modified Mel Frequency Cepstral Coefficient (MFCC) obtained by combining conventional Mel filter structure and reverse structure of conventional Mel filter. In one example, the audio feature may include cepstral coefficients, zero crossing rate, spectral power roll off etc. The power intensive sensors 106 further generate a metadata file. In one example, the metadata file may be an XML metadata file containing the information of the power effective sensor 104 and the contextual information. The contextual information may include location based information, timestamp information, traffic conditions, weather conditions, area estimations and the like. The location based information is captured using received signal strength indicator (RSSI) signals sensed from one or more hand held devices present within or in close proximity of the object area.

The hand held device 102 further compresses the features and corresponding metadata file for transmitting to the backend server 108 for analysis, using the network 118. The analysis enables tracking the object area condition. The backend server 108 decompresses the compressed features and the corresponding metadata file obtained from the hand held device 112. The decompressed features and the corresponding metadata file are stored in the mapping module respectively. The backend server 108 is loaded with one or more training models 110. In one example, the training models 110 are created using a Gaussian Mixture Model classifiers based on audio analysis of horn and non horn sound detected from the object area. The non horn sound includes non vehicular noise sound emanating from engine idle noise, tire noise, air turbulence noise, human speech, vehicle music noise and the like.

The analysis at the backend server involves, mapping the features and the corresponding metadata file with one or more pre-stored training models 110 of the backend server that enables tracking the status and condition of the object area. In one example, tracking the status and condition of the object area may be used to display the traffic density (low/high) of the particular object area along with the latitude and longitude of the area and may be visualized on a Google Map application on users' mobile device 102.

In one implementation, the object area condition refers to traffic condition.

Figure 2:
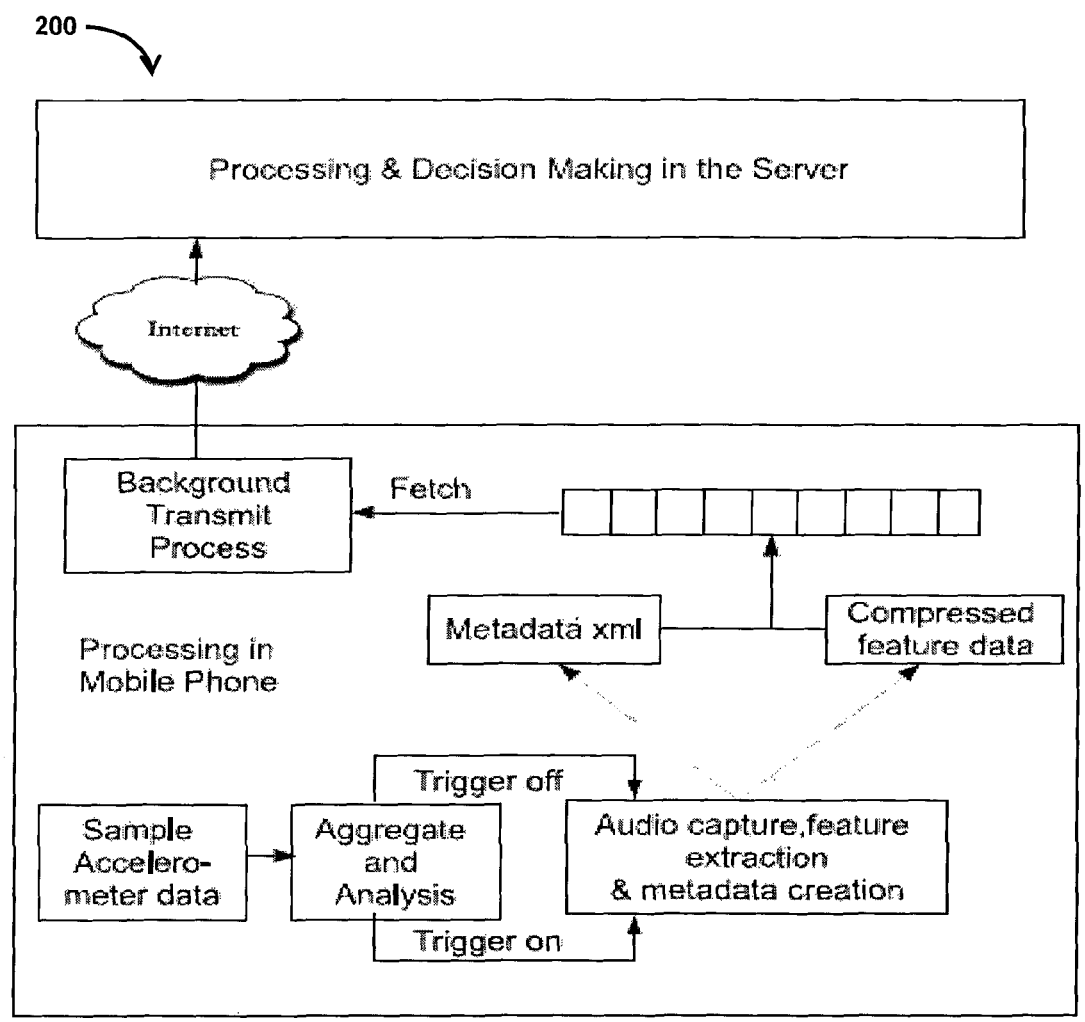
FIG. 2 illustrates a block diagram of processing at users' mobile phone, in accordance with an embodiment of the present subject matter.

Referring now to FIG. 2, the block diagram of processing at users' mobile phone 200, in accordance with an exemplary embodiment of the present subject matter.

In one implementation, the processing at the users' mobile end is explained as an exemplary embodiment of the present invention wherein the object area condition refers to a traffic condition in an object area. The power effective sensors like accelerometer capture the dynamic state data of a vehicle. The data is sampled and aggregated in real time. A location manager application may be used to tracks the location information based on wireless network of the phone. The accelerometer data is computed and compared against a threshold limit prior to trigger on the capturing of audio recording by the power intensive sensors. In one example the lower threshold value is considered as 0.5 and the upper threshold value is considered as 1.2. Feature extraction is done simultaneously on the recorded audio in real time. During the process of audio recording a metadata xml file is generated which contains location information and time related information. The location information may be derived from the RSSI information using Android Application Programming Interface (API). Audio feature data is compressed to reduce data rate. In one example, the compressed feature and corresponding metadata file are locally stored in a queue. There exists a background process that listens to the queue and posts the compressed feature data and xml file to a backend server 108 for further processing.

Figure 3:
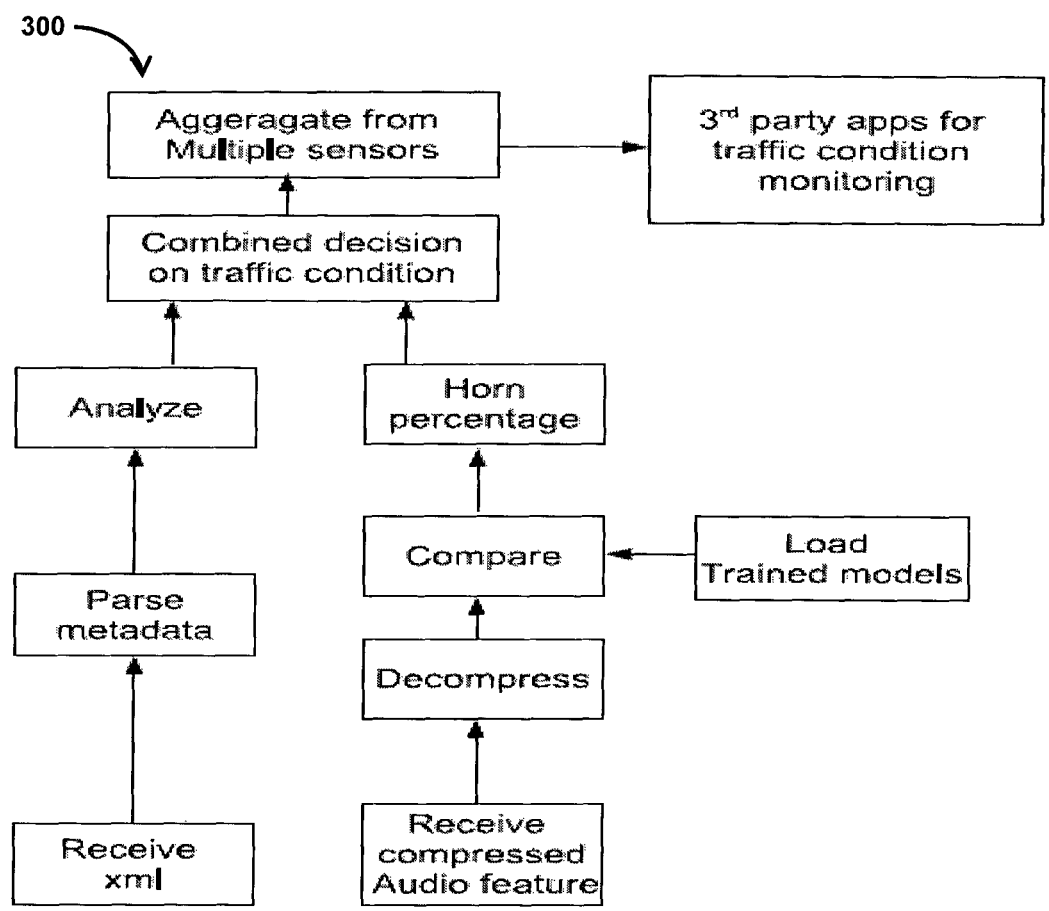
FIG. 3 illustrates a block diagram of processing at a backend server, in accordance with an embodiment of the present subject matter.

Referring now to FIG. 3, the block diagram of processing 300 at the backend server 108, in accordance with an embodiment of the present subject matter.

In one implementation, the processing at the backend server 108 is explained as an exemplary embodiment of the present invention, wherein the object area condition refers to traffic condition. The backend server 108 is mainly responsible for audio processing for horn detection and for combining the results with the xml metadata file entries. A background process always runs in the server that receives the compressed feature data and xml files arriving from mobile devices, as discussed in FIG. 3. After Receiving, the compressed feature data is decompressed. Training models for horn sounds and other traffic sounds are already loaded in the server. This process may be off-line and done only once. Extracted features are compared with the training models and decision making is done based on maximum probability score model. In one example, the decision making may be performed using Gaussian Mixture Models (GMM) algorithm. The training models are created using GMM. Thus, two models are created, one for horn sound and the other for non-horn sound. During the recognition phase, the decision-making is done based on maximum probability score with respect to the training models for the test samples. The XML files received are decompressed and parsed for analyzing the data preset in the file. Further, the audio comparing result is combined with the xml metadata entries and decision making is done by collecting results from many sensors in similar location using fusion. The decision making is discussed in detail, in FIG. 4. Based on the results the traffic conditions may be obtained using navigation application in smart hand held devices. In one example, the navigation application may include a "Google Map", which is available to users for public use. The traffic condition may be periodically updated in the backend server 108.

Figure 4:
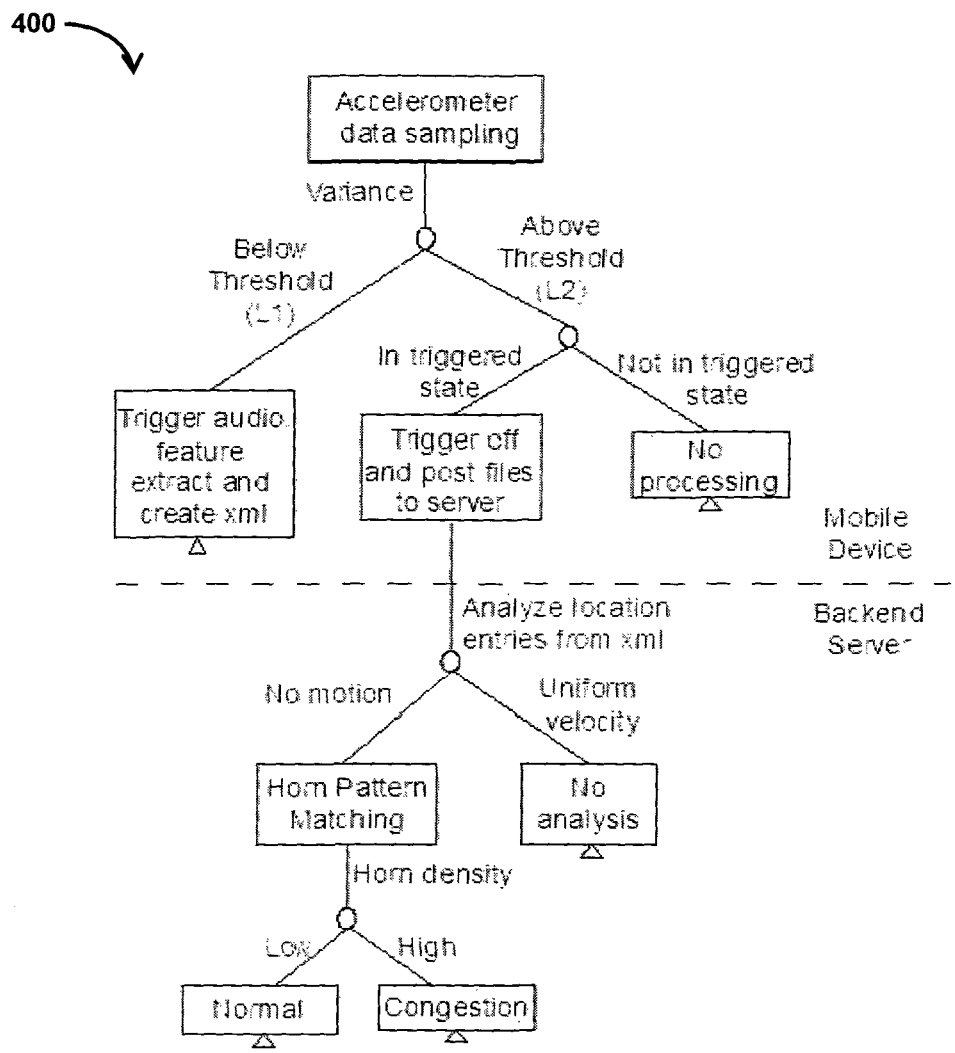
FIG. 4 illustrates a decision tree for traffic condition monitoring, in accordance with an exemplary embodiment of the present subject matter.

Referring now to FIG. 4, the decision tree for traffic condition monitoring 400, in accordance with an embodiment of the present subject matter.

In one implementation, the decision tree for traffic condition monitoring is explained as an exemplary embodiment of the present invention, wherein the object area condition refers to traffic condition. The decision making is for vehicle traffic congestion condition monitoring. The variance of accelerometer data is first analyzed. Analysis is performed each sample obtained by calculating the variance of the absolute magnitude of the accelerometer reading. From the results, it is observed that, when the vehicle is in rest, the variance of accelerometer data is very less. However when the vehicle is in motion, the variance of accelerometer data becomes high. The reason lies in the fact that both velocity and acceleration of a vehicle in motion is fixed and they change abruptly for changing lanes, pulling brakes etc. Based on the above facts, the participatory sensing system 100 provides the decision tree based approach for traffic condition monitoring, is as shown in FIG. 4. The system 100 performs the steps like calculating the variance of accelerometer sample data, in one example. As shown in FIG. 4, if the value is below a predetermined threshold value L1, it triggers the audio recording; feature extraction and metadata file creation. In one example the lower threshold value is considered as 0.5 and the upper threshold value is considered as 1.2. If the variance value is below L1, there can be two cases—the vehicle is either in rest or is moving with uniform velocity. The above two cases are separated out by observing the geo locations. If the vehicle is in motion there is a high possibility that two geo locations will not be the same. Further analysis is done on audio features where the vehicle is in rest to derive the traffic condition.

Figure 5:
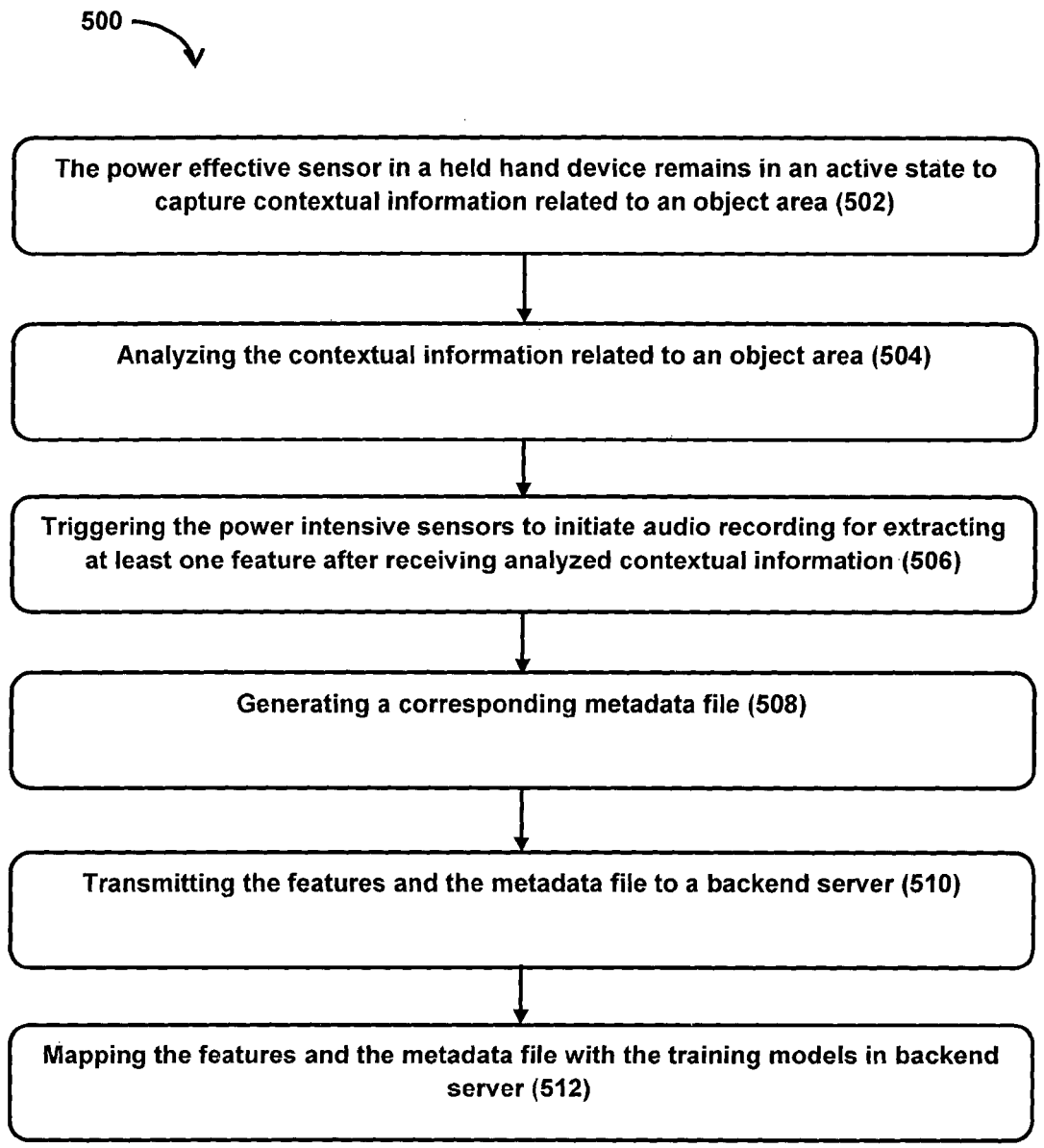
FIG. 5 illustrates a participatory sensing method, in accordance with an embodiment of the present subject matter.

Referring now to FIG. 5, the participatory sensing method for tracking and monitoring of the objects in an area condition (500), in accordance with an embodiment of the present subject matter.

At block 502, the power effective sensor in the held hand device remains in an active state to capture contextual information related to an object area. The contextual information includes location based information, timestamp information, traffic conditions, weather conditions, area estimations and the like. The location based information is captured using received signal strength indicator (RSSI) signals sensed from one or more hand held devices present within or in close proximity of the object area.

At block 504, the contextual information related to an object area is analyzed. The analysis of the contextual information is based on vehicular static or dynamic state interpreted from accelerometer data, and vehicle honking rate.

At block 506, the power intensive sensors are triggered to initiate audio recording for extracting at least one feature after receiving the analyzed contextual information. The variance of the accelerometer data is computed and compared against a threshold limit prior which is used as to trigger the power intensive sensors into an active state.

At block 508, the corresponding metadata file is generated concurrently with step 506. The metadata file includes the contextual information.

At block 510, the extracted features and the metadata file are transmitted to the backend server for analysis. The features and the metadata file are compressed and transmitted to the backend server for obtaining reduced data rate.

At block 512, after decompressing, the features and the metadata file are mapped with the training models in backend server. In a preferred embodiment, the training models are preloaded in the backend server. The training models are created using a Gaussian Mixture Model classifiers based on audio analysis of horn and non horn sound detected from the object area.

Although implementations for systems and methods an energy efficient method for participatory sensing for enabling at least one power effective sensor to monitor operations of one or more power intensive sensors, it is to be understood that the appended claims are not necessarily limited to the specific features or methods described. Rather, the specific features and methods are disclosed as examples of implementations for system and method for power effective participatory sensing.

We claim:

1. A computer implemented method for power effective participatory sensing, the method comprising:
    enabling at least one power effective sensor to monitor operation of one or more power intensive sensors, wherein the power effective sensor is in an active state to capture and analyze contextual information related to an object area in response to receiving analyzed contextual information from the power effective sensor;
    triggering the one or more power intensive sensors, based on the analyzed contextual information, to initiate audio recording and extracting at least one feature from the audio recording, and concurrently generating a corresponding metadata file, wherein the metadata file comprises information related to the power effective sensor and the contextual information; and
    transmitting the at least one feature and the metadata file for analysis to a backend server, wherein said at least one feature and the metadata file are analyzed for tracking the object area condition.

2. The method of claim 1, wherein the contextual information comprises of location based information, timestamp information, traffic conditions, weather conditions, area estimations and the like.

3. The method of claim 2, wherein the location based information is captured using received signal strength indicator (RSSI) signals sensed from one or more hand held devices present within or in close proximity of the object area.

4. The method of claim 1, wherein the analysis of the contextual information is based on vehicular static or dynamic state interpreted from accelerometer data, and vehicle honking rate.

5. The method of claim 4, wherein variance of the accelerometer data is computed and compared against a threshold limit prior to trigger the power intensive sensors into an active state.

6. The method of claim 1, wherein the audio feature extraction is accomplished using a modified Mel Frequency Cepstral Coefficient (MFCC) obtained by combining the conventional Mel filter structure and reverse structure of conventional Mel filter.

7. The method of claim 1, further comprising compressing the features and corresponding metadata at the hand held device and decompressing the compressed features and the corresponding metadata at the backend server.

8. The method of claim 1, wherein the analysis at the backend server involves, mapping the features and the corresponding metadata file with one or more pre-stored training models of the backend server.

9. The method of claim 8, wherein the training models are created using a Gaussian Mixture Model classifiers based on audio analysis of horn and non horn sound detected from the object area.

10. The method of claim 9, wherein the non horn sound includes non vehicular noise sound emanating from engine idle noise, tire noise, air turbulence noise, human speech, vehicle music noise and the like.

11. The method of claim 1, wherein the object area condition refers to traffic condition thereof.

12. A participatory sensing system, comprising:
    a hand held device equipped with plurality of sensors, and configured to enable at least one power effective sensor to monitor operation of one or more power intensive sensors, wherein the power effective sensor is in an active state to capture and analyze contextual information related to an object area in response to receiving analyzed contextual information from the power effective sensor;
    trigger the one or more power intensive sensors, based on the analyzed contextual information, to initiate audio recording and extract at least one feature from the audio recording and concurrently generate a corresponding metadata file, wherein the metadata file comprises information related to the power effective sensor and the contextual information; and
    a backend server loaded with one or more training models that are mapped against the at least one features and the metadata file received from the hand held device to track and monitor the object area condition.

13. The participatory sensing system of claim 12, wherein the power effective sensors include an accelerometer, orientation sensor and the like, or a combination thereof.

14. The participatory sensing system of claim 12, wherein the power intensive sensors include microphones; location providing sensors such as Global Positioning System (GPS); gyroscope and the like, or a combination thereof.

15. The participatory sensing system of claim 12, wherein the contextual information comprises of location based information, timestamp information, traffic conditions, weather conditions, area estimations and the like.

16. The participatory sensing system of claim 12, wherein the power effective sensor analyses the contextual information based on vehicular static or dynamic state interpreted from an accelerometer data, and vehicle-honking rate.

17. The participatory sensing system of claim 12, wherein the power intensive sensors accomplishes feature extraction by using a modified Mel Frequency Cepstral Coefficient (MFCC) obtained by combining conventional Mel filter structure and reverse structure of conventional Mel filter.

18. The participatory sensing system of claim 12, wherein the hand held device is further configured to compress the features and corresponding metadata, while the backend server is further configured to decompress the compressed features and the corresponding metadata obtained from the hand held device.

19. The participatory sensing system of claim 12, wherein the training models are created using Gaussian Mixture Model classifiers based on audio analysis of horn and non horn sound detected from the object area.

20. The participatory sensing system of claim 12, wherein the object area condition refers to traffic condition thereof.

* * * * *